Patented Jan. 1, 1952

2,581,154

UNITED STATES PATENT OFFICE 2,581,154

TERTIARY-BUTYL HALIDE PROMOTERS IN FRIEDEL-CRAFTS CATALYZED OLEFIN POLYMERIZATIONS

David C. Walsh, Jr., and Henry G. Schutze, Baytown, Tex., assignors, by mesne assignments, to Standard Oil Development Company, Elizabeth, N. J., a corporation of Delaware No Drawing. Application July 1, 1948,
Serial No. 36,415

9 Claims. (Cl. 260—85.3)

The present invention is directed to an improved process for the polymerization of low molecular weight unsaturated hydrocarbons in the presence of a Friedel-Crafts type catalyst. More particularly, the invention is directed to the polymerization of mixtures of low molecular weight unsaturated hydrocarbons in the presence of a Friedel-Crafts type catalyst and a promoter for the reaction.

This application is a continuation-in-part of our abandoned co-pending application Serial No. 737,726, filed March 27, 1947.

Prior to the present invention it has been customary to polymerize tertiary olefins, such as isobutylene, alone or in admixture with diolefins, such as butadiene or isoprene, in the presence of a Friedel-Crafts type catalyst to obtain a product of higher molecular weight than the starting material such, for example, as polymers in the lubricating oil boiling range or rubber-like polymers. The process is extremely sensitive to impurities and it is necessary that expensive expedients be resorted to in order to purify the reactants. Impurities which are removed from the reactants comprise acidic material, unsaturated polymers of relatively low molecular weight, oxygenated bodies and various other extraneous materials which may find their way into the system in which the polymerization is effected. The purification steps comprise various chemical and physical treating methods to obtain the purified product.

It is desirable also to remove water from the unsaturated hydrocarbons since water in appreciable quantities will hydrate the Friedel-Crafts type catalyst and render it less efficient than when the reactants are in an anhydrous condition.

The nature of the impurities has made it difficult to obtain the reactant hydrocarbons in substantially pure condition. From time to time it has, therefore, been necessary, in order to obtain best results, to increase the concentration of the Friedel-Crafts type catalyst which is employed. Ordinarily, the catalyst is employed in a solution of an organic halide in a concentration of about 0.1 to 0.5 gram of aluminum chloride per 100 c. c. of solvent. The usual solvent employed is an alkyl halide, such as methyl chloride. In order to compensate for a drop in the efficiency of the catalyst, at times it has been necessary to increase the concentration of aluminum chloride to the upper limit given to keep the reaction rate at a constant level. The adoption of this expedient may result in the formation of a polymerization product having undesirable properties in view of the unpredictable activity of these concentrations of catalyst solution.

In accordance with the present invention, the polymerization of low boiling tertiary base olefins, alone or in admixture with low boiling conjugated diolefins, to form polymeric hydrocarbons in the molecular weight range of lubricating oil and rubber-like polymers in the presence of a Friedel-Crafts type catalyst is improved by the addition to the reaction mixture of controlled amounts of tertiary butyl chloride or tertiary butyl bromide. It has been discovered that tertiary butyl chloride or tertiary butyl bromide in the reaction mixture in an amount between 6 and 100 parts per million parts of hydrocarbon feed promotes the reaction and activates the catalyst to a degree that solutions of low catalyst concentration may be employed. Previous workers have reported tertiary butyl halides to have a poisoning effect on the polymerization catalyst, thus adversely affecting the reaction. We have found that within the concentration range mentioned above, the reverse is true and tertiary butyl chloride and tertiary butyl bromide have a powerful activating effect.

Low boiling tertiary base olefins which may suitably be employed in the present invention include isobutylene, 2-methyl butene-3, 2-methyl pentene-1, 2-methyl pentene-2, 3-methyl pentene-2, 2,3-dimethyl butene-1, 2,3-dimethyl butene-2, 3-methyl hexene-2, 3-methyl hexene-3, 3-ethyl butene-2, 2,3-dimethyl pentene-2, 2,4-dimethyl pentene-1, 2,4-dimethyl pentene-2, 2,3,3-trimethyl butene-3, and higher tertiary base olefins or mixtures thereof, although we prefer to use such tertiary base olefins that contain not more than 7 carbon atoms per molecule.

Low boiling conjugated diolefins which may suitably be employed in the present invention include, in general, such conjugated diolefins as 1,3-butadiene, 2-methyl-1,3-butadiene or isoprene, 2,3-dimethyl-1, 3-butadiene, 1,3-pentadiene, 2-methyl-1,3-pentadiene, 2,3-dimethyl-1,3-pentadiene, and the like or mixtures thereof, having preferably not more than 7 carbon atoms per molecule.

Suitable Friedel-Crafts type catalysts which may be employed in the present invention for the polymerization of tertiary base olefins or mixtures of tertiary base olefins and conjugated diolefins include $AlCl_3$, $AlBr_3$, $AlI_3$, $TiCl_4$, $BF_3$, $ZrCl_4$, $FeCl_3$, $ZnCl_2$, $SbCl_5$, and the like. Although any of the aforementioned Friedel-Crafts type catalysts may be employed, AlCl₃ is preferred inasmuch as it particularly lends itself to polymerization reactions of the type with which this invention is concerned. Irrespective of which particular Friedel-Crafts type catalyst is employed, it is introduced into the reactants in the form of a solution, the catalyst being dissolved in a solvent for the catalyst, which does not react with the catalyst. Solvents having the aforementioned properties and which have been found to be suitable include methyl chloride, ethyl chloride, chloroform, ethylene dichloride, sulfuryl chloride, carbon bisulfide, and the like.

In the practice of the present invention, both the feed stock containing unsaturated hydrocarbons and the catalyst solution are thoroughly dehydrated. A controlled amount of tertiary butyl halide is added to the stream of fresh feed to be polymerized. The fresh feed and catalyst streams are separately chilled to the desired temperature and discharged into a vessel provided with a mixing means where the reactants are mixed as rapidly as possible and then allowed to remain in contact for a predetermined period of time. After the reaction has proceeded a sufficient period of time to form the desired polymer, it is terminated by suitable means, such as by adding to the reaction mixture a material which destroys the activity of the catalyst, such as water or alcohol, and the polymer is then separated as the desired product.

It is to be emphasized that the activating effect of tertiary butyl chloride or tertiary butyl bromide is obtained only when the compound is added to the olefin feed and is not obtained when it is added to the catalyst solution.

The operation described above is generally applicable to the polymerization of low boiling tertiary base olefins, alone or in admixture with low boiling conjugated diolefins in the presence of a Friedel-Crafts type catalyst to form polymeric hydrocarbons in the molecular weight range of lubricating oils and of viscous rubbery polymers. The reaction is carried out at a temperature in the range of about −220° F. to about 200° F., the particular temperature chosen within this range depending upon the molecular weight of the polymer it is desired to form. In general, the lower the temperature employed within the aforementioned range, the higher the average molecular weight of the polymer will be. For example, when it is desired to produce polymers in the molecular weight range of lubricating oils, reaction temperatures in the range of about −50° F. to about 175° F. are preferably employed, the viscosity and the molecular weight of the product usually being lower with higher reaction temperatures. Thus, at temperatures of around 175° F. polymers in the low viscosity, relatively low boiling distillate range are obtained while at temperatures in the neighborhood of 0° F., relatively high boiling viscous lubricating oils may be obtained. When it is desired to react low boiling tertiary olefins, preferably in admixture with low boiling conjugated olefins, to form polymers which are rubber-like materials or vulcanizable gums at ordinary temperatures, lower reaction temperatures are necessary, preferably in the range of about −50° F. and about −220° F. Preferably the polymerization reaction is carried out within the range of about −100° F. to −175° F. when it is desired to form vulcanizable gums.

Pressure has little, if any, influence on the course of the reaction; consequently, the reaction may normally be conducted at atmospheric pressure when temperatures below the boiling points of the reactants are maintained. The reactants and the solvent for the catalyst should, however, be maintained in liquid phase during the reaction. The reaction is therefore conducted under sufficient pressure to maintain the reactants and the solvent in liquid phase. The particular pressure required will, of course, depend in each instance upon the vapor pressure of the reactant mixture.

While the process of the present invention has been fully described hereinbefore, this process is further illustrated by reference to an operation wherein high molecular weight rubber-like polymers are formed. In such a process a mixture of a tertiary base olefin and a conjugated diolefin may be employed and a catalyst may suitably be prepared by agitating dehydrated methyl chloride with substantially anhydrous powdered aluminum chloride at a temperature of about −20° F. to give a solution of a concentration of about .1 to .5 gram of aluminum chloride per 100 cubic centimeters. The aforementioned feed mixture, comprising a tertiary base olefin, such as isobutylene, having admixed therein from 2 to 20 weight per cent based on the tertiary olefin of a conjugated diolefin, such as butadiene or isoprene, may be dehydrated by passing it over a bed of calcium chloride or other suitable dehydrating agent. The hydrocarbon feed stock may be dissolved in an alkyl halide, such as methyl chloride, if desired, and the solution then chilled to about −40° F. and passed into a vessel. The solution of aluminum chloride in methyl chloride is chilled to a temperature slightly above the freezing point of methyl chloride, say −120° F., and the catalyst sprayed into the vessel through a nozzle while the diolefin-mono-olefin mixture in the vessel is being violently agitated. From 10 to 20 volume per cent of catalyst solution may be employed which may be added over a period ranging from about ten seconds to ten minutes. After the reactants have been in contact the desired interval of time, the reaction may be terminated by the addition to the vessel of a large excess of water or alcohol. The polymer is then recovered and carefully washed to remove the catalyst after which the polymer may be dried and compounded as is desired. In the quenching step, the catalyst is intentionally destroyed in order to prevent further action beyond the desired polymerization. This quenching step can be effected by any hydrolyzing agent such as alcohol or water, but it is preferred to use hot water.

Although the foregoing describes a batch polymerization process, it is understood that the process may be made to operate on a continuous basis by constantly adding fresh feed and catalyst to the agitated reaction mixture and constantly removing the product as a slurry along with unconverted feed and methyl chloride.

The invention will be further illustrated by the following examples in which isobutylene and isoprene diluted with methyl chloride were polymerized in a batch reactor. The methyl chloride was purified by treatment with phosphoric anhydride. A catalyst solution containing aluminum chloride in an amount of 0.070 gram of aluminum chloride per 100 cc. of solution was employed. To a chilled reactor was introduced 1000 parts of a precooled feed comprising isobutylene, isoprene and methyl chloride. The feed contained 25% isobutylene and a small amount of isoprene, amounting to 2.5 weight per cent of the isobutylene. The feed stock was charged to a cold reactor which had been dried, purged and blanketed with nitrogen. A stirring mechanism was attached and a means was provided for injection of catalyst solution. The feed stock was cooled to —145° F. and injection of catalyst solution was started and maintained at a constant rate equivalent to 0.004 part of aluminum chloride per minute. After the desired amount of catalyst had been added, the reactant mass, which was in the form of a slurry, was agitated for an additional two minutes and the reaction stopped by addition of alcohol. The reacted material was then further quenched by the addition of hot water. The rubbery material was kneaded in the presence of hot water until a crumbly body was formed. The crumbs of polymer were strained and squeezed to remove as much entrained water as possible until the water content was in the range of 10%. The weight of the polymer was recorded and corrected for the amount of water remaining in the polymer mass. From the data obtained on the weight of polymer produced, the catalyst efficiency and the conversion of olefin to polymer were calculated.

EXAMPLE I

Runs in accordance with the foregoing procedure were conducted without addition of tertiary butyl chloride and with addition of tertiary butyl chloride to the olefin feed in amounts varying from 16 to 120 parts per million of reaction mixture. In each run the feed to the reactor was 1000 parts of a mixture of the type described in the previous paragraph and catalyst addition amounted to 0.02 part. Comparative runs in every respect were made using a two minute contact time between the catalyst and olefin. The data obtained from these runs are recorded in the following table:

*Table I*

| Catalyst Efficiency Lbs. of Polymer per Lb. of Catalyst | Conversion, Per Cent | Polymer Produced, Parts | AlCl₃ Catalyst Added, Parts | Catalyst Required to Initiate Reaction, Parts | Tertiary Butyl Chloride Added to Feed, Parts per Million |
|---|---|---|---|---|---|
| 100 | 0.8 | 2 | 0.02 | 0.017 | None |
| 1,900 | 14.8 | 38 | 0.02 | 0.003 | 16 |
| 2,250 | 17.6 | 45 | 0.02 | 0.003 | 40 |
| 2,400 | 18.7 | 48 | 0.02 | 0.003 | 64 |
| 2,100 | 16.4 | 42 | 0.02 | 0.003 | 80 |
| 2,150 | 16.8 | 43 | 0.02 | 0.003 | 120 |

EXAMPLE II

The general procedural steps employed in this example were similar to those described for Example I with reference to feed preparation, catalyst injection and polymer recovery except that the injection of catalyst was not discontinued after 0.02 part of catalyst had been added. Instead, each run was made with a different amount of catalyst to obtain different polymer yields. The amount of tertiary butyl chloride in the reaction mixture was kept constant at 6 parts per million for each of the several runs. The data obtained from these runs are recorded in the following table:

*Table II*

| Catalyst Efficiency, Lbs. of Polymer per Lb. of Catalyst | Conversion, Per Cent | Polymer Produced, Parts | AlCl₃ Catalyst Added, Parts | Catalyst Required to Initiate Reaction, Parts | Tertiary Butyl Chloride Added to Feed, Parts Per Million |
|---|---|---|---|---|---|
| 1,940 | 25.0 | 64 | 0.033 | 0.005 | 6 |
| 2,260 | 41.4 | 106 | 0.047 | 0.005 | 6 |
| 2,800 | 54.6 | 140 | 0.050 | 0.003 | 6 |
| 2,360 | 61.7 | 158 | 0.067 | 0.005 | 6 |
| 2,350 | 70.6 | 181 | 0.077 | 0.005 | 6 |

EXAMPLE III

The several runs of Example III were conducted in the same manner as those of Example II except that no tertiary butyl chloride was included in the reaction mixture. The data obtained from these runs are recorded in the following table:

*Table III*

| Catalyst Efficiency, Lbs. of Polymer per Lb. of Catalyst | Conversion, Per Cent | Polymer Produced, Parts | AlCl₃ Catalyst Added, Parts | Grams of Catalyst Required to Initiate Reaction, Parts |
|---|---|---|---|---|
| 2,303 | 29.7 | 76 | 0.033 | 0.017 |
| 2,330 | 36.4 | 93 | 0.040 | 0.017 |
| 2,410 | 50.8 | 130 | 0.054 | 0.017 |
| 2,410 | 63.3 | 162 | 0.067 | 0.017 |
| 2,390 | 69.2 | 177 | 0.074 | 0.017 |
| 2,220 | 86.7 | 222 | 0.100 | 0.017 |

It will be noted from the foregoing data in Table I that the catalyst efficiency and the amount of polymer produced is greatly increased at conversions below 20% by the addition of tertiary butyl chloride to the feed. It is obvious from these data that the optimum promotional concentration of tertiary butyl chloride in the feed is 60 to 70 parts per million, as the catalyst efficiency was a maximum at this concentration. It is of great significance that very small concentrations (16 parts per million) of the activator have almost as much influence in initiating the reaction as the larger quantities. In this connection attention is directed to the column of Table I showing the quantity of catalyst required to initiate the polymerization reaction. It will be seen that in the run in which no tertiary butyl chloride was added to the feed, the polymerization reaction was initiated only after 0.017 part of catalyst had been added. The low catalyst efficiency, conversion, and polymer yield reflect the low activity of the catalyst. During the remaining runs in which tertiary butyl chloride was added to the feed the polymerization reaction started almost immediately upon the injection of catalyst solution into the reaction mixture as indicated by the very small quantities (0.003 part or less) of catalyst required to initiate the reaction.

By comparing the data of Examples II and III, it will be seen that at conversions in excess of 25% the catalyst efficiency and the polymer yield is not appreciably affected by the employment of tertiary butyl chloride as an activator in the reation mixture. On the other hand, the powerful promotional effect of the activator is observed by comparison of the columns showing the grams of catalyst required to initiate the reaction in Example II in which 6 parts per million of tertiary butyl chloride was added to the feed, and Example III in which no tertiary butyl chloride was used. In the case where 6 parts per million of tertiary butyl chloride was used as an activator, the polymerization reaction was initiated after only 0.003–0.005 part of aluminum chloride catalyst had been added to the reaction mixture. In the case where no activator was employed, the quantity of catalyst required to initiate the reaction was 0.017 part in all runs.

It should be emphasized that although the polymerization reaction is caused to begin at much lower catalyst concentrations when employing tertiary butyl chloride as an activator than when this compound is not present, the yield of polymer and the catalyst efficiency are essentially the same at conversions above 25% irrespective of whether the activator is added or is left out of the reaction mixture. It is of great significance, however, that at conversions below 25%, especially within the range of 15 to 25%, not only is the reaction initiated at lower catalyst concentrations but also the yield of polymer and the catalyst efficiency is greatly increased by the presence of tertiary butyl chloride in the reaction mixture.

The present invention has been described with reference to the production of elastomers by the low temperature polymerization of a diolefin and a tertiary olefin. It is to be understood that the activating effects of tertiary butyl halide are not restricted to the production of elastomers but may also be realized in the polymerization reaction wherein low molecular weight tertiary base olefins, alone or in admixture with low molecular weight conjugated diolefins, are reacted to produce lubricants and other desirable hydrocarbon products. In the case where such unsaturated hydrocarbons are polymerized to yield lubricating oils, a temperature in the range of −50° to 200° F. may be found desirable.

The nature and objects of the present invention having been fully described and illustrated, what is claimed as new and useful and is desired to be secured by Letters Patent is:

1. A process for polymerizing unsaturated hydrocarbons which includes the steps of forming a substantially anhydrous feed stock at a temperature in the range of −220° F. and 0° F. comprising a tertiary olefin having at least 4 and not more than 7 carbon atoms per molecule, an alkyl halide and a material selected from the group consisting of tertiary butyl chloride and tertiary butyl bromide, the said material being present in the feed stock in an amount in the range of 6 to 100 parts per million parts of hydrocarbon in the feed stock, admixing said feed stock with a substantially anhydrous solution of a Friedel-Crafts catalyst chilled to substantially the same temperature as the feed stock to form a reaction mixture including a polymer, terminating the reaction and recovering said polymer.

2. A process for polymerizing unsaturated hydrocarbons which includes the steps of forming a dehydrated feed stock at a temperature in the range of −220° F. and 0° F. comprising a tertiary olefin having at least 4 and not more than 7 carbon atoms per molecule, a conjugated diolefin having at least 4 and not more than 7 carbon atoms per molecule, an alkyl halide and a material selected from the group consisting of tertiary butyl chloride and tertiary butyl bromide, the said material being present in the feed stock in an amount in the range of 6–100 parts per million parts of hydrocarbon in the feed stock, admixing said feed stock with a dehydrated solution of a Friedel-Crafts catalyst chilled to substantially the same temperature as the feed stock to form a reaction mixture including a polymer, terminating the reaction by adding to the reactants an agent for destroying the activity of the Friedel-Crafts catalyst and recovering said polymer.

3. A process for polymerizing unsaturated hydrocarbons which includes the steps of forming a dehydrated feed stock at a temperature in the range of −220° F. and 0° F. comprising a tertiary olefin having at least 4 and not more than 7 carbon atoms per molecule, a conjugated diolefin having at least 4 and not more than 7 carbon atoms per molecule, an alkyl halide and a material selected from the group consisting of tertiary butyl chloride and tertiary butyl bromide, the said diolefin being present in the feed stock in an amount in the range of 2 to 20% by weight based on the tertiary olefin in the feed stock and the said material being present in the feed stock in an amount in the range of 6 to 100 parts per million parts of hydrocarbon in the feed stock, admixing said feed stock with a dehydrated solution of a Friedel-Crafts catalyst chilled to substantially the same temperature as the feed stock to form a reaction mixture including a polymer, terminating the reaction by adding an agent for destroying the activity of the Friedel-Crafts catalyst and recovering said polymer.

4. A process in accordance with claim 3 in which the tertiary olefin is isobutylene.

5. A process in accordance with claim 3 in which the diolefin is isoprene.

6. A process in accordance with claim 3 in which the Friedel-Crafts catalyst is aluminum chloride.

7. A process in accordance with claim 3 in which the agent for destroying the activity of the catalyst is water.

8. A process for producing a polymer from unsaturated hydrocarbons which includes the steps of forming a dehydrated feed stock comprising isobutylene, a conjugated diolefin having at least 4 and not more than 7 carbon atoms per molecule, methyl chloride and a material selected from the group consisting of tertiary butyl chloride and tertiary butyl bromide, the said diolefin being present in the feed stock in an amount in the range of 2 to 20% by weight based on the isobutylene in the feed stock and the said material being present in the feed stock in an amount in the range of 6 to 100 parts per million parts of hydrocarbon in the feed stock, chilling the feed stock to a polymerization temperature in the range of —50° F. and —220° F., forming a dehydrated solution comprising aluminum chloride and a solvent which does not react with the aluminum chloride, chilling said dehydrated solution to substantially the same temperature as the feed stock, admixing said chilled dehydrated solution with the chilled feed stock to form a reaction mixture including a polymer, terminating the reaction by adding water to the reaction mixture and recovering said polymer.

9. A process in accordance with claim 8 in which the conjugated diolefin is isoprene.

DAVID C. WALSH, JR.
HENRY G. SCHUTZE.

REFERENCES CITED

The following references are of record in the file of this patent:

UNITED STATES PATENTS

| Number | Name | Date |
|---|---|---|
| 2,311,004 | Thomas | Feb. 16, 1943 |
| 2,427,303 | Reid | Sept. 9, 1947 |
| 2,471,890 | Palmer | May 31, 1949 |

OTHER REFERENCES

Getman and Daniels: "Outlines of Theoretical Chemistry," 6th ed., pp. 332, 333, Wiley (1937).